(12) United States Patent
Korneev

(10) Patent No.: US 9,067,548 B1
(45) Date of Patent: Jun. 30, 2015

(54) LICENSE PLATE TAG METHOD AND APPARATUS

(71) Applicant: Andrey Korneev, Arlington, TX (US)

(72) Inventor: Andrey Korneev, Arlington, TX (US)

(*) Notice: Subject to any disclaimer, the term of this patent is extended or adjusted under 35 U.S.C. 154(b) by 29 days.

(21) Appl. No.: 14/135,483

(22) Filed: Dec. 19, 2013

(51) Int. Cl.
*B60R 13/10* (2006.01)
*B32B 37/06* (2006.01)

(52) U.S. Cl.
CPC ............... *B60R 13/105* (2013.01); *B32B 37/06* (2013.01)

(58) Field of Classification Search
CPC .............................. B60R 13/10; B60R 13/105
See application file for complete search history.

(56) References Cited

U.S. PATENT DOCUMENTS

| | | | | |
|---|---|---|---|---|
| 1,403,302 A | * | 1/1922 | Dunn | 40/202 |
| 5,149,571 A | * | 9/1992 | Croell | 428/41.7 |
| 5,195,123 A | * | 3/1993 | Clement | 378/166 |
| 5,623,776 A | * | 4/1997 | Lucier | 40/209 |
| 5,819,449 A | * | 10/1998 | Molson | 40/200 |
| 6,324,778 B1 | * | 12/2001 | Gall | 40/594 |
| 6,385,876 B1 | * | 5/2002 | Mc Kenzie | 40/201 |
| 7,204,909 B1 | * | 4/2007 | Curiel et al. | 156/268 |
| 2006/0162196 A1 | * | 7/2006 | Kaiser | 40/208 |
| 2009/0100725 A1 | * | 4/2009 | Freeman | 40/209 |
| 2012/0096748 A1 | * | 4/2012 | Volpe | 40/209 |
| 2013/0042966 A1 | * | 2/2013 | Look | 156/227 |
| 2014/0373403 A1 | * | 12/2014 | Mendoza | 40/200 |

* cited by examiner

*Primary Examiner* — Gary Hoge
(74) *Attorney, Agent, or Firm* — Law Office of Jeff Williams; J. Oliver Williams

(57) ABSTRACT

A method of attaching a vehicular identification member to a vehicle performed by obtaining a vehicle identification member having selectively identifying information regarding the vehicle. Form a first fastener slot along an edge of the vehicular identification member. Next, positioning the vehicular identification member within a protective member. The protective member has a second fastener slot corresponding to and aligned with the first fastener slot. Translate the vehicular identification member and protective member around a threaded shaft of the fastener while the fastener is in threaded engagement with the vehicle. Rotate the fastener to apply a compressive force to the protective member, thereby securing the vehicular identification member to the vehicle.

13 Claims, 4 Drawing Sheets

LICENSE PLATE TAG METHOD AND APPARATUS

BACKGROUND

1. Field of the Invention

The present application relates generally to identification of automotive vehicles and, more particularly a method of installing and protecting identification material to a vehicle.

2. Description of Related Art

Motorized transportation has been around for decades. Such transportation includes boats, cars, trucks, all-terrain vehicles, motorcycles and so forth. Vehicles used on public lands (i.e. roads, paths, waterways) typically need to be registered with a particular government agency depending on location. When registered, a license or vehicle identification is prepared. Some licenses are temporary and others are permanent.

Temporary licenses are typically used for short durations and assist in the new sale, transfer of ownership of vehicles, and temporary use of a vehicle. Temporary licenses are typically made from a paper based material and protected in a thin plastic sleeve closed on three ends. The plastic sleeve is an attempt at preventing damage to the temporary license through environmental conditions and ensuring transparency for visual identification of the license. However, the sleeves often trap moisture inside which result in clouded or obstructed views of the license.

A temporary license may or may not come with holes for attaching to a vehicle. When holes are present, the holes are typically circular and set away from the edge. Therefore, to attach the license, the corresponding screws on the vehicle have to be removed completely. After aligning the license, the screws puncture the plastic sleeve and are re-threaded into the vehicle. A disadvantage of this method is the need to remove the screws. Removing the screws is time consuming and sometimes results in the loss or mishandling of screws. Additionally, the punctured sleeve may stretch, tear, or leak such that the head of the screw may not seal the opening. Moisture may then enter the sleeve and damage the license.

Although great strides have been made in attaching licenses to vehicles, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
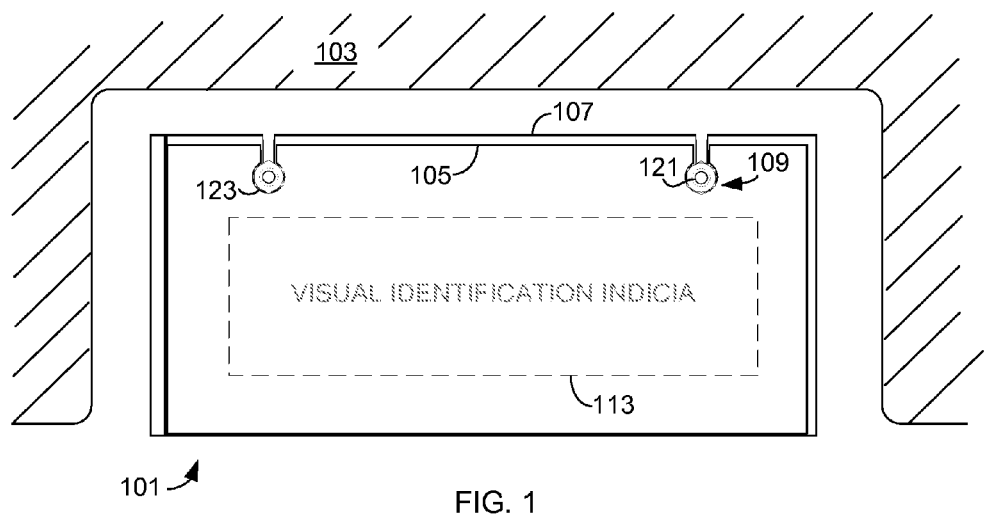
FIG. 1 is an identification system according to the preferred embodiment of the present application with fasteners.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring now to FIG. 1 in the drawings, an identification system is illustrated. Identification system 101 is configured to secure and display particular information with respect to a vehicle 103 to which it is attached. In the preferred embodiment, identification system 101 includes a vehicular identification member 105 and a protective member 107. Member 105 is configured to uniquely display and identifying information with respect to vehicle 103. Member 107 is configured to enclose member 107 in order to protect member 105 from external elements such as moisture, dirt, and debris.

Information may be displayed on either, or both, of members 105 and 107. In the preferred embodiment, member 105 uniquely identifies vehicle 103 with a government issued identification tag. An example of member 105 is a license plate from an authorized government agency. It is known however that other forms of information may be presented within identification system 101, such information may allow for the owner/operator of vehicle 103 to customize an appearance or image with slogans, mottos, pictures, and so forth. A personal customized appearance or motto may be used by the owner/operator to also uniquely identify vehicle 103.

Figure 9:
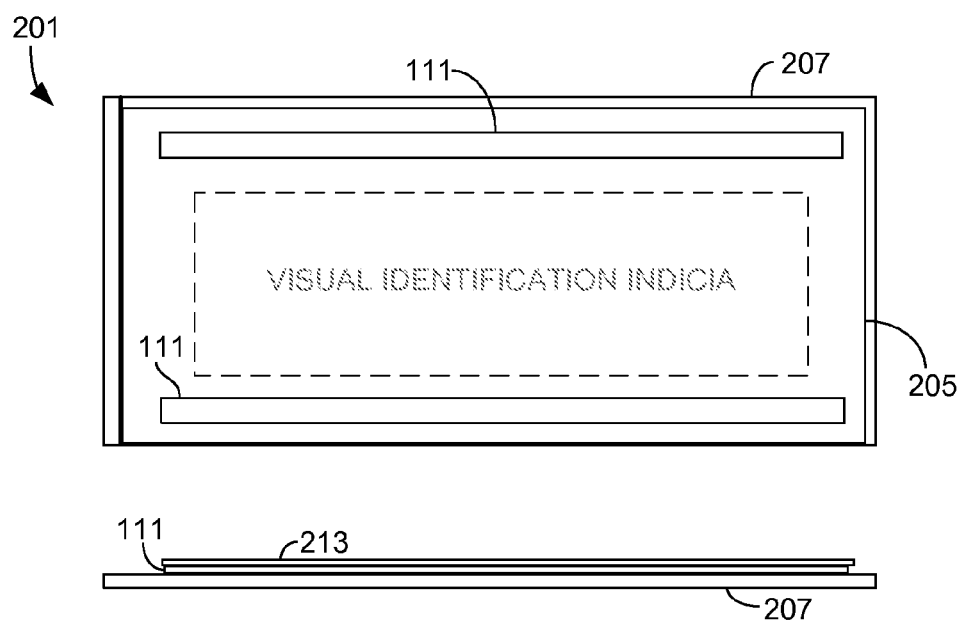
FIG. 9 is top and side views of an alternative embodiment of the identification system of FIG. 1.

Identification system 101 is selectively configured to attached to vehicle 103 in at least one of two ways: 1) with the use of a fastener 109; and 2) with the use of an adhesive layer 111 (see FIG. 9). Each method of attaching system 101 to vehicle 103 is described herein in greater detail. It is understood that vehicle 103 may have one or more meanings. In the present application, vehicle 103 is associated with any motorized transportation device, including a car, truck, motorcycle, boat, all-terrain vehicle, aircraft, hovercraft, and/or recreational vehicle, for example.

Figure 2:
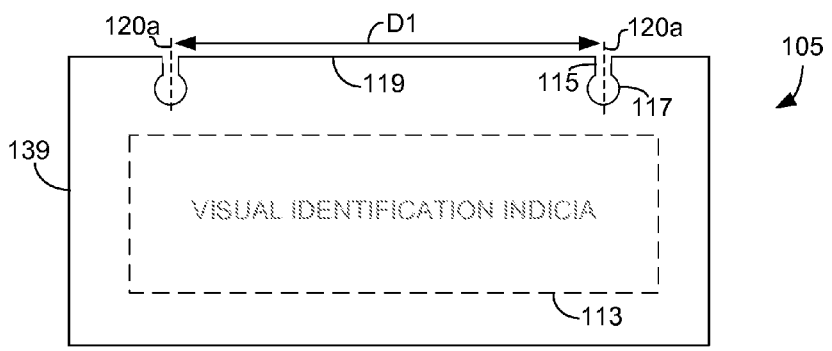
FIG. 2 is a vehicular identification member used in the system of FIG. 1.

Referring now also to FIG. 2 in the drawings, vehicular identification member 105 is illustrated. Member 105 is preferably a paper based material, such as: paper, card stock, poster board, construction paper, or other type of paper material. In other embodiments, member 105 may be a textile member, such as a fabric or canvass material; or a metallic material such as one containing aluminum or tin for example.

Member 105 includes a visual indicia section 113, a fastener slot 115, and a keyed aperture 117. Section 113 represents the portion of member 105 which contains the uniquely identifying information. It is understood that this area is not limited to that section depicted in FIG. 2. It is also understood that section 113 may in fact be one of a plurality of similar sections in other embodiments. The information displayed in section 113 is preferably printed material such as lettering and numerical identifiers. It is understood that other embodiments may include watermarks, pictorial and artistic markings or drawings, tinting, and other graphical displays. It is in section 113 that vehicle 103 is preferably uniquely identified.

Member 105 may be attached to vehicle 103 via fasteners 109 as seen in FIG. 1. Fasteners 109 are typically in threaded engagement with vehicle 103 at the time of installation of system 101. In order to ease installation of system 101, fastener slot 115 is punched through member 105 adjacent an edge 119. A hole punch device or other punching device with a designed bit may be used to punch slot 115. Slot 115 is a channel sized to pass on either side of a threaded shaft 121 of fastener 109. Slot 115 permits edge 119 to translate past shaft 121 between vehicle 103 and head 123 of fastener 109, all while fastener 109 remains in threaded engagement with vehicle 103. The width and length of slot 115 is selectively chosen depending on the type of vehicle 103 and fastener 109 used. Slot 115 may be no more than a selectively located cut in member 105. Where more than one slot 115 is used, the distance D between slots 115 may be selectively tailored to match that of vehicle 103. Although depicted wherein slot 115 has parallel edges, it is understood that the edges of slot 115 may be non-parallel and also may be oriented at non-perpendicular angles with respect to edge 119.

Figure 3:
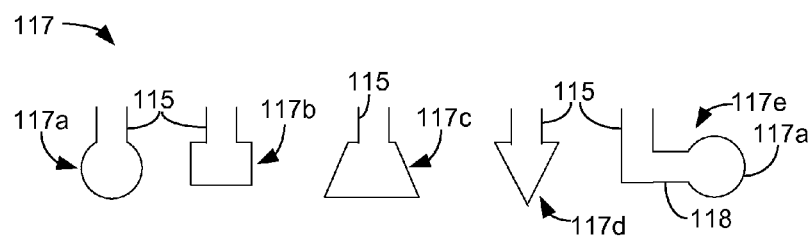
FIG. 3 is a plurality of keyed aperture shapes used in the system of FIG. 1.

Referring now also to FIG. 3 in the drawings, various designs of keyed apertures are illustrated. Keyed aperture 117 is configured to assist with alignment of member 105 in relation to head 123 and account for chamfers and fillet radiuses of fastener 109, and so forth. Keyed aperture 117 is punched through member 105 along a portion of slot 115 distal from edge 119. Much like slot 115, aperture 117 is formed merely by removing a portion of member 105. Keyed aperture 117 is not limited to any particular shape. FIG. 3 illustrates various shapes, such as: circular 117a, rectangular 117b, rhombus 117c, and triangle 117d. It is understood that the shape of aperture 117 may be selectively chosen based upon design constraints and preferences. The shapes illustrated in the figures are not meant to be limiting, but rather serve as an illustrative example of a selected few possible shapes. In other embodiments keyed aperture 117 may also include an additional slot 118 extending from slot 115 as seen with aperture 117e. In use, member 105 is punched with either slot 115 by a user or with slot 115 and keyed aperture 117. Slot 118 may also be punched. Slot 115, aperture 117, and slot 118 are configured to assist in the efficient installation of member 105 to vehicle 103.

Referring now also to FIGS. 4-7 in the drawings, protective member 107 is illustrated in various embodiments. Protective member 107 is a multilayered transparent article configured to permit an unobstructed view of member 105. Protective member 107 is configured to sealingly enclose member 105 to prevent exterior foreign substances from contacting member 105. In so doing, protective member 107 is configured to house member 105 by extending around and beyond all edges of member 105. In order to generate a seal around member 105, protective member is configured to accept lamination. In the preferred embodiment, member 107 is made from a laminating material, such that the application of heat forms a bond between opposing layers of member 107. An advantage of sealing member 105 within member 107 is the ability to eliminate the exposure to foreign substances which may lead to fogging of member 107, water damage to member 105, and tearing to member 107. The life span of system 101 is greatly increased through lamination of member 107. Although a heat induced laminate bond is preferred, it is understood that cold laminate bonding is also acceptable for generating the seal.

Figure 4:
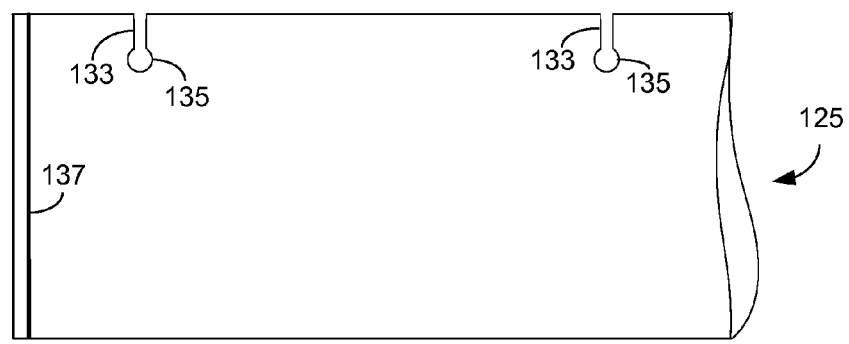
FIGS. 4-7 are examples of various embodiments of a protective member used to enclose the vehicular identification member of FIG. 2.
Figure 5:
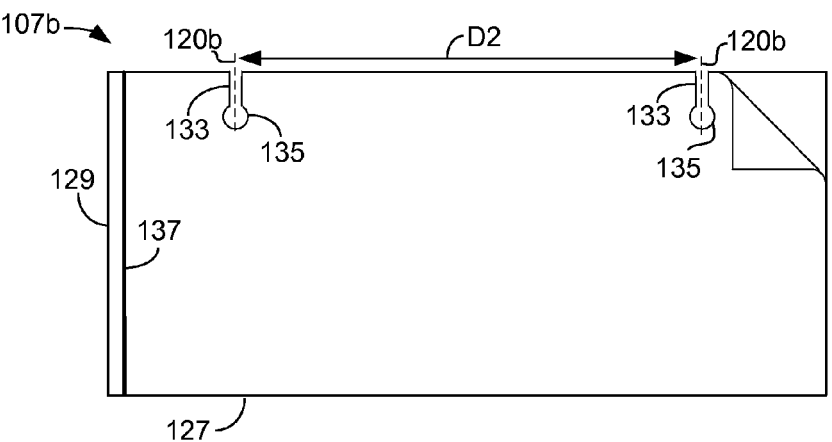
Figure 6:
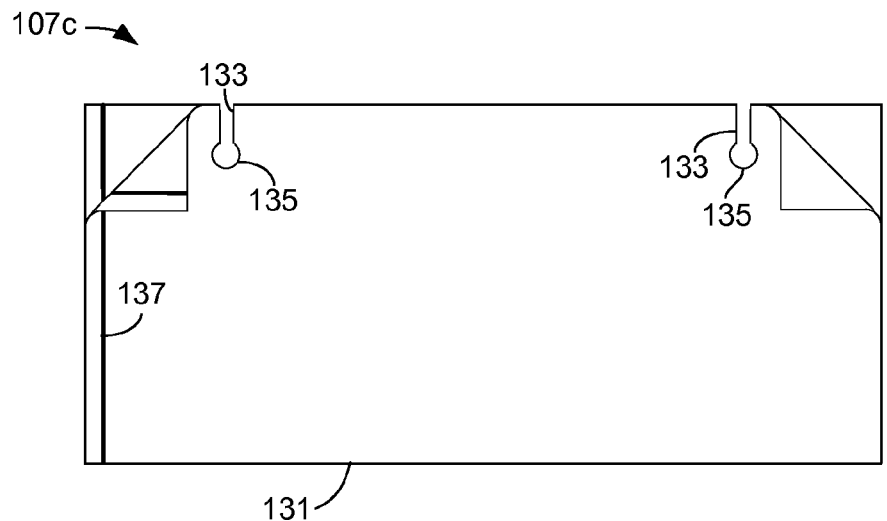

Member 107 is formed as a multilayered apparatus wherein member 105 is inserted between opposing layers. FIGS. 4-7 illustrate various embodiments and forms in which member 107 may exist, namely members 107a, 107b, 107c. In FIG. 4, member 107a is illustrated as a sleeve in which member 105 would be inserted within a singular open end 125. Each other end of member 107a is bonded together. In FIG. 5, member 107 is illustrated as having two bonded edges 127, 129. In FIG. 6, member 107c is illustrated as having a singular edge 131. Member 107c may form edge 131 by folding member 107c into equal sections, wherein edge 131 represents the fold. It should be understood that member 107 may be formed by two separate sheets in some embodiments as well. However, it is preferred that at least one edge of the opposing layers be bonded to simplify insertion and alignment of member 105.

In the preferred embodiment of member 107, corresponding slots 133 and keyed apertures 135 will be formed. Slot 133 will correspond to slot 115. Aperture 135 will correspond to aperture 117. The spacing distance D2 between a plurality of slots 133 and slots 115 are configured to match the spacing distance D1 in member 105 as measured from each slot's centerline 120a, 120b. Additionally, the sizing of slot 133 and aperture 135 is configured to be dimensionally smaller than the corresponding ones used in member 105. This is to ensure that member 107 seals around edges within slots 115 and aperture 117. For example, slot 133 is narrower than slot 115. Likewise the sizing of aperture 117 would be larger than that of aperture 135. By incorporating slots 115, 133 and optionally apertures 117, 135 into member 105 and 107, identification member 105 may be installed and attached to vehicle 103 without breaking the seal of member 107 through puncturing or tearing member 107. Furthermore, slots 115, 133 and optionally apertures 117, 135 permit system 101 to pass around shaft 121 of fastener 109, thereby avoiding the need to remove fasteners 109 from vehicle 103 during installation of system 101.

Slot 133 and aperture 135 are preferably preformed into member 107, thereby facilitating the user to pre-determine the type of slot 115 and aperture 117 as well as the spacing to be used in member 105. Because member 105 is punched separately from that of member 107, there arises a need to align member 105 within member 107. As seen if FIGS. 1 and 4-6, member 107 further includes an alignment marking 137. Marking 137 is configured to represent or identify a particular placement of an edge 139 of member 105 to ensure proper alignment of slot 115 with slot 135. Marking 137 is a tinting located along one or more layers of member 107. Marking 137 may be formed within member 107 or may be selectively added by a user to permit the fluctuation of vehicle 103 sizes and fluctuation of member 105 sizes.

Figure 7:
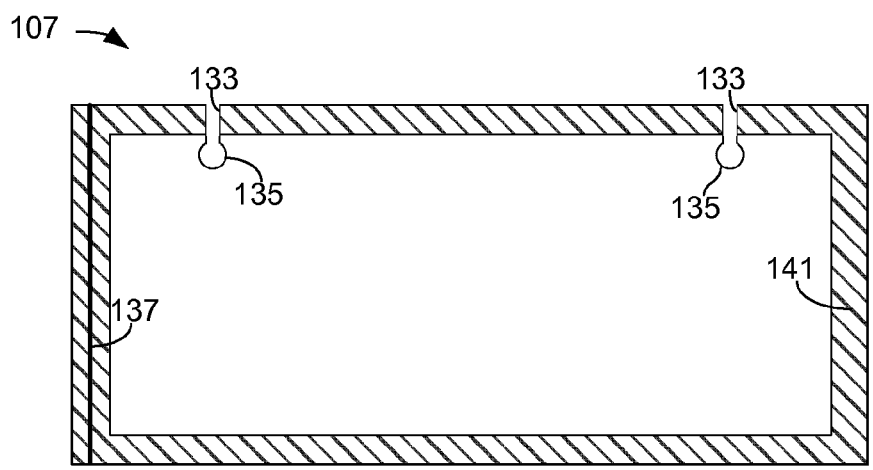

Although described as being transparent, member 107 may include selective amounts of tint or graphical indicia 141 apart from that of marking 137, as seen in FIG. 7. Indicia 141 is depicted as extending around the edges of member 107 so as not to obstruct the view of section 113. Indicia 141 may include tint, print, or graphics, to name a few. It is understood that other embodiments may permit the selective tinting or placement of indicia 141 across section 113 as long as the view of the information within section 113 is not obstructed. The use of indicia 141 and marking 137 is optionally included and operable with any of members 107a, 107b, 107c as well as any other form such as separate sheets described previously.

Figure 8:
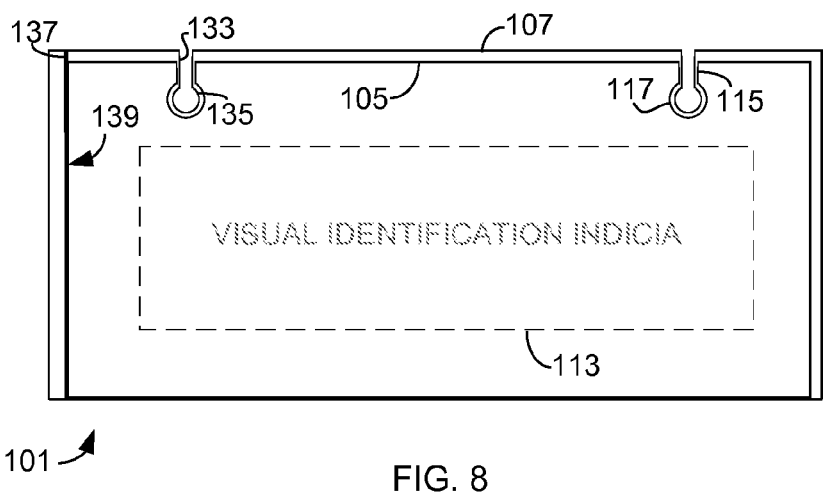
FIG. 8 is the identification system of FIG. 1 as seen without fasteners.

Referring now also to FIG. 8 in the drawings, system 101 is illustrated. In FIG. 8, member 105 is illustrated within and sealingly enclosed by member 107. Member 107 has undergone a laminating process to bind opposing layers of member 107 to one another around the edges of member 105, slot 115, and aperture 117. Marking 137 is shown as being aligned with edge 139 thereby aligning slots 115 and 117. Although indicia 141 are not illustrated, it is understood that indicia 141 may be selectively included.

System 101 may include one or more other types of attaching devices to assist in securing system 101 to vehicle 103. Examples of other attaching devices is the use of a removable adhesive or magnets.

Referring now also to FIG. 9 in the drawings, a top view and side view of an identification system 201 is illustrated. System 201 includes member 205 and 207. Members 205 and 207 are similar in form and function to members 105 and 107 respectively. System 201 differs from system 101 in that member 207 does not need to include a slot or aperture similar to slot 133 or aperture 135 (slots are optional). Member 207 extends beyond and around the edges of member 205 as with system 101. Therefore application of slots or apertures in the identification member is not necessary.

Because the punching of slots and apertures are not performed in member 207, system 201 includes an adhesive layer 111 selectively applied to a single side of member 207 to attach system 201 to vehicle 103. Layer 111 may be applied before or after sealing member 207. If member 207 is hot laminated then layer 111 is applied after lamination. If member 207 is cold laminated, then layer 111 may be applied to member 207 before or after lamination. Layers 111 are selectively arranged on member 207. Each layer 111 includes a removable layer 213 configured to selectively peel away from layer 111 to permit the adhesive bonding of member 207 to vehicle 103.

As mentioned above, member 207 is similar in form and function to that of member 107. This includes the various forms illustrated in FIGS. 4-6. It is understood that adhesive layers 111 may be included with system 101 as described in FIGS. 1-8 above by selectively applying layers 111 before or after lamination.

During operation of attaching a vehicular identification member to a vehicle, a user obtains a vehicular identification member and applies printing or graphical information within section 113. Once printed or applied, the user punches one or more slots 115 and/or apertures 117 along an edge of the identification member. The user obtains a protective member 107 and positions the identification member within the protective member. The protective member is pre-punched to include a slot and/or slot and aperture. The slots and/or slot aperture punched by the user in the identification member is sized, selected, and spaced to correspond to the slots and/or slots and aperture pre-punched in the protective member. In order to facilitate alignment of the slots and/or apertures, the protective member includes an alignment marking. The user aligns an edge of the identification member with the alignment marking to align the slots and/or aperture of the identification member and protective member.

A user optionally may seal the identification member within the protective member by using a lamination process. The lamination process may include heat applied directly to the protective member or may be a cold process using an adhesively bonding sheet. The combined protective member and sealed identification member are then attached to the vehicle. To attach, fasteners in threaded engagement with the vehicle are retained in the vehicle. The fasteners may be loosened if necessary. System 101 is translated relative to the fasteners such that the shaft of the fastener passes within the slots of the protective member and identification member. The fastener is then rotated to apply a compressive force to the protective member, thereby securing the identification member to the vehicle.

Alternatively, use of an adhesive layer may be used to attach the identification system to the vehicle. After an identification member has been obtained and the information is printed or attached to the indicia section 113, the identification member is positioned within a protective member. The protective member is sealed. The adhesive layer is expose by removing a removable layer configured to selectively peel away from the adhesive layer. Once exposed, the adhesive layer is pressed against the vehicle to secure the position of the identification member. An additional step may be to apply an adhesive layer following the lamination process in some embodiments.

The current application has many advantages over the prior art including the following: (1) increased durability; (2) simplified installation; (3) increasing the visibility of the identification member by preventing exposure to external elements.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An identification system for a vehicle, comprising:
a vehicular identification member configured to uniquely identify the vehicle;
a first fastener slot punched through the vehicular identification member;
a protective member configured to enclose the vehicular identification member; and
a second fastener slot punched through the protective member, the second fastener slot aligning with and covering edges of the first fastener slot;
wherein the first fastener slot and the second fastener slot are selectively sized and configured to pass around a fastener in threaded engagement with the vehicle, so as to permit the protective member and vehicular identification member to be secured to the vehicle; and wherein the first fastener slot includes a first keyed aperture and the second fastener slot includes a second keyed aperture.

2. The identification system of claim 1, wherein the vehicular identification member includes visual indicia including at least one of a watermark, print lettering, a marking, and a numerical identifier.

3. The identification system of claim 1, wherein the protective member is transparent to permit an unobstructed view of the vehicular identification member.

4. The identification system of claim 1, wherein the wherein the protective member is configured to sealingly enclose the vehicular identification member to prevent exterior foreign substances from contacting the vehicular identification member.

5. The identification system of claim 4, wherein the protective member is laminated around the vehicular identification member to form a sealed enclosure.

6. The identification system of claim 1, wherein the protective member includes an alignment marking to position the first fastener slot with the second fastener slot.

7. The identification system of claim 1, wherein the protective member includes graphical indicia.

8. A method of attaching a vehicular identification member to a vehicle, comprising:
- obtaining the vehicular identification member;
- forming a first fastener slot along an edge of the vehicular identification member;
- positioning the vehicular identification member within a protective member, the protective member having a second fastener slot, the first fastener slot being aligned with the second fastener slot when positioned;
- translating the vehicular identification member and protective member around a fastener in threaded engagement with the vehicle; and
- rotating the fastener to apply a compressive force to the protective member, thereby securing the vehicular identification member to the vehicle.

9. The method of claim 8, wherein the vehicular identification member includes visual indicia including at least one of a tint, print lettering, a marking, and a numerical identifier.

10. The method of claim 8, wherein the protective member includes an alignment marking configured to act as a guide to align the first fastener slot with the second fastener slot.

11. The method of claim 8, further comprising:
- sealing the protective member around the vehicular identification member.

12. The method of claim 11, wherein the sealing is performed through lamination of the protective member.

13. The method of claim 12, wherein lamination is performed by applying heat to the protective member.

* * * * *